(12) United States Patent
Chang et al.

(10) Patent No.: US 6,818,043 B1
(45) Date of Patent: Nov. 16, 2004

(54) VAPOR-PHASE CONTAMINANT REMOVAL BY INJECTION OF FINE SORBENT SLURRIES

(75) Inventors: Ramsay Chang, Los Altos, CA (US); Frank Meserole, Austin, TX (US); Carl Richardson, Austin, TX (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 10/350,999

(22) Filed: Jan. 23, 2003

(51) Int. Cl.[7] .................. B01D 53/10; B01D 53/64; B01D 53/72

(52) U.S. Cl. .............. 95/37; 95/36; 95/62; 95/65; 95/72; 95/107; 95/133; 95/134; 95/143; 95/273; 96/27; 96/52; 96/74; 96/108; 423/99; 423/213.2; 423/240 S

(58) Field of Search ................. 95/36–38, 58, 95/62, 64, 65, 67, 71, 72, 90, 92, 107, 133, 134, 141, 143, 234, 237, 273; 96/27, 52, 53, 74, 108; 423/99, 100, 210, 213.2, 240 S

(56) References Cited

U.S. PATENT DOCUMENTS

| | | | | |
|---|---|---|---|---|
| 2,823,765 A | * | 2/1958 | Maslan | 95/37 |
| 2,823,766 A | * | 2/1958 | Maslan | 95/36 |
| 2,858,901 A | * | 11/1958 | Fort, Jr. | 95/37 |
| 2,875,844 A | * | 3/1959 | Pring | 95/108 |
| 3,068,627 A | * | 12/1962 | Sherwood | 95/37 |
| 3,416,293 A | * | 12/1968 | Alexander | 95/136 |
| 3,563,697 A | * | 2/1971 | De Castro | 423/210 |
| 3,755,989 A | * | 9/1973 | Fornoff et al. | 95/134 |
| 3,793,389 A | * | 2/1974 | Oleszko et al. | 585/867 |
| 3,876,393 A | * | 4/1975 | Kasal et al. | 95/134 |
| 3,969,482 A | | 7/1976 | Teller | |
| 3,984,217 A | * | 10/1976 | Huntington | 95/16 |
| 4,256,703 A | * | 3/1981 | Dixit et al. | 423/23 |
| 4,274,842 A | * | 6/1981 | Lindau | 95/108 |
| 4,708,853 A | * | 11/1987 | Matviya et al. | 423/210 |
| 4,834,959 A | | 5/1989 | Kent et al. | |
| 4,874,400 A | * | 10/1989 | Jury | 95/38 |
| 4,877,515 A | * | 10/1989 | Audeh | 208/251 R |
| 4,889,698 A | | 12/1989 | Moller et al. | |
| 5,238,665 A | * | 8/1993 | Lerner | 423/240 S |
| 5,266,285 A | | 11/1993 | Glancy et al. | |
| 5,439,508 A | * | 8/1995 | Mayer-Schwinning et al. | 95/58 |
| 5,505,766 A | | 4/1996 | Chang | |
| 5,553,782 A | | 9/1996 | Licht et al. | |
| 5,569,436 A | * | 10/1996 | Lerner | 422/170 |
| 5,827,352 A | * | 10/1998 | Altman et al. | 95/58 |
| 6,027,551 A | * | 2/2000 | Hwang et al. | 95/134 |
| 6,126,910 A | | 10/2000 | Wilhelm et al. | |
| 6,258,334 B1 | * | 7/2001 | Gadkaree et al. | 423/210 |
| 6,444,184 B1 | * | 9/2002 | Goss | 423/210 |
| 6,508,994 B1 | * | 1/2003 | Åhman et al. | 423/210 |
| 6,521,021 B1 | * | 2/2003 | Pennline et al. | 95/134 |
| 6,558,454 B1 | * | 5/2003 | Chang et al. | 95/901 |
| 2002/0117094 A1 | * | 8/2002 | Teller et al. | 110/345 |
| 2002/0134242 A1 | * | 9/2002 | Yang et al. | 95/107 |
| 2002/0198097 A1 | * | 12/2002 | El-Shoubary et al. | 502/56 |
| 2003/0143128 A1 | * | 7/2003 | Lanier et al. | 422/171 |
| 2004/0003716 A1 | * | 1/2004 | Nelson | 95/134 |

FOREIGN PATENT DOCUMENTS

| | | | |
|---|---|---|---|
| EP | 0200695 A1 | * | 11/1986 |
| EP | 0208490 | | 1/1987 |
| EP | 0370648 A1 | * | 5/1990 |

* cited by examiner

*Primary Examiner*—Robert H. Spitzer
(74) *Attorney, Agent, or Firm*—Dorsey & Whitney

(57) ABSTRACT

A method for efficiently removing vapor-phase contaminants from gas streams is described. A powdered adsorbent such as activated carbon is ground into a fine powder by wet grinding to form a slurry. Chemicals are added to the slurry to impregnate the sorbent to enhance sorbent effectiveness. The slurry chemical mixture is sprayed into the gas stream in the form of small droplets which evaporate to produce an aerosol of fine adsorbent particles. Vapor-phase contaminants in the gas stream adsorb onto the fine adsorbent particle surfaces and the adsorbent particles are removed from the gas stream by a conventional particle collection method.

20 Claims, 3 Drawing Sheets

```
┌─────────────────────────────────────────────┐
│ Wet-grind powdered sorbent in an aqueous solution │──202
│ to form a slurry of fine sorbent particles         │
└─────────────────────────────────────────────┘
                      │
┌─────────────────────────────────────────────┐
│         Atomize slurry into gas stream       │──204
└─────────────────────────────────────────────┘
                      │
┌─────────────────────────────────────────────┐
│ Solvent volatilizes at elevated temperature to     │
│ produced dispersed aerosol of particles impregnated │──206
│              with solute molecules                  │
└─────────────────────────────────────────────┘
                      │
┌─────────────────────────────────────────────┐
│ Dispersed aerosol particles scavenge vapor-phase   │──210
│                  contaminants                       │
└─────────────────────────────────────────────┘
                      │
┌─────────────────────────────────────────────┐
│ Contaminant-enriched aerosol particles are         │
│ separated from the gas stream using a particle     │──212
│              separation method                      │
└─────────────────────────────────────────────┘
                      │
                      ▼                    ── 200
```

Figure 3

VAPOR-PHASE CONTAMINANT REMOVAL BY INJECTION OF FINE SORBENT SLURRIES

FIELD OF THE INVENTION

This invention relates generally to a method for removing vapor-phase contaminant compounds from a gas stream. The method treats exhaust gases from a combustion or industrial process to remove gas phase contaminants such as mercury and trace metal and organic compounds, and other vapor compounds that are not readily removed by conventional exhaust gas treatment processes. This invention may be applied to treat flue gases from coal or oil-fired boilers, incinerator flue gases, and other sources of gas-phase environmental contaminants. Specifically, the invention relates to a method of injecting a slurry of a fine adsorbent material and chemical additives into an exhaust gas stream to enhance adsorption of gas-phase contaminants onto the resulting particles that are then readily collected by conventional means.

BACKGROUND OF THE INVENTION

Control of atmospheric emissions from industrial and power generating processes has long been recognized as an important and often complex problem. Environmental standards for emissions from manufacturing and combustion sources such as petroleum and chemical refineries, incinerators, metal extraction operations, and power plants are becoming increasingly stringent. Title III of the 1990 United States Clean Air Act Amendments requires major emission sources to control emissions of air toxics to less than 10 tons per year of any one species and less than 25 tons per year for all species. The U.S. Environmental Protection Agency (EPA) is developing proposed mercury regulations which may be even more stringent and plans to issue final regulations on mercury emissions from coal-fired boilers by Dec. 15, 2004 with full compliance to be required by December, 2007.

Air toxics present in the flue gases of combustion sources are typically present in both the particulate and gas phases. The particulate phase includes both fly ash and particulate metals such as nickel, arsenic, and chromium. More volatile metals, such as mercury and selenium, as well as organic compounds and halides, tend to partition between the vapor phase and the fly ash. The phase distribution of volatile and semivolatile contaminants in exhaust gases is a generally complex function of a number of factors including temperature and the chemistry of both the contaminant compound and the particulate phase.

Mercury has long been known as an important health and environmental hazard. As such, a number of techniques have been developed to remove mercury from gas streams. These include injecting dry sorbents into the gas stream before removal of particles in a particulate collection device, passing the gas stream through a fixed sorbent bed, or using a wet scrubbing method to absorb soluble mercury species. Sorbent injection mercury control typically uses activated carbon or some comparable carbon-based sorbent that typically has particle sizes in the range of 10 to 40 $\mu$m. The powdered sorbent is dispersed into the duct work of an exhaust gas flow system as a dry powder via a tube fed by a pneumatic transport system or other similar apparatus. Particles in the range of 10 to 40 $\mu$m are small enough to become entrained in rapidly moving air such as in a flue gas stream. After a short contact time—approximately 1 to 5 seconds—particles are removed from the flue gas by means of a conventional particle collection system such as a baghouse filter or an electrostatic precipitator before the gas is exhausted into the environment. Cost estimates indicate that commercialization of this contaminant control method for cleaning the flue gas of coal fired electric power plants could result in a five percent increase in electricity prices and that 95 percent of the increase would be due to the cost of the activated carbon consumed in some cases.

A key limitation of the aforementioned sorbent-based control method for vapor-phase contaminant control is the mass transfer rate, the amount of mercury contacting the sorbent surface over time. One of the determining factors for mass transfer is sorbent particle size. Modeling calculations and actual tests of mercury removal in coal-derived flue gas by sorbent injection demonstrate that smaller sorbent particle sizes increase removal efficiencies for mercury and other gas-phase-contaminants. The smaller the sorbent particle size for a given mass of sorbent, the better the mass transfer and therefore the better the mercury adsorption effectiveness. However, simply grinding larger particle size activated carbon or other sorbent powders into smaller particles is not a straightforward process. There is an increased energy cost associated with formation of smaller particles, and this cost increases dramatically for particle sizes less than approximately 5 $\mu$m. Activated carbon particles as small as 2 to 3 $\mu$m in effective diameter may be formed through mechanical grinding, but this process becomes cost prohibitive from an energy standpoint. Additionally, dry grinding to form particles of this size frequently leads to severe dust problems during preparation, handling, and use of the activated carbon. Storage and feeding of very fine dry powders is further complicated by caking and clumping issues.

In some flue gases, vapor-phase mercury is not effectively removed by activated carbon because the mercury species present do not adsorb well on the activated carbon surface. Under these conditions, the sorptive capacity of the activated carbon may be improved through the use of special chemical additives such as sulfur and halide compounds impregnated into the activated carbon before injection into the flue gas. Prior art methods of preparing activated carbon in this manner employ additional processing and handling steps which can add significant cost to the process.

Moller et al. (U.S. Pat. No. 4,889,698) disclose a method for removal of mercury and gas-phase organic compounds, such as chlorodibenzodioxins and chlorodibenzofurans, from flue gases that employs injection of powdered activated carbon into the flue gas in conjunction with a spray absorption process using alkali sorbents for removal of acid gases. The spray absorption step of the disclosed method serves to cool the exhaust gas and lower the vapor pressure of the vapor-phase contaminants, thereby enhancing adsorption and condensation of vapor-phase contaminants on fly ash particles and the injected activated carbon particles, as well as improving the removal of acid gases on the alkali components. In this prior art system, the powdered sorbent particles are prepared and added separately from the liquid injection step. Any grinding that is required to produce particles of the desired size is done by a dry method.

An additional prior art reference by Moller et al. is provided in a patent application published by the European Patent Office (Application No. 86305054.8, published Jan. 14, 1987). This application discloses a method for treating flue gases to remove vapor phase mercury and chlorinated dioxins and furans. The method comprises "incorporation of a relatively small amount of activated carbon in an alkaline feed suspension" that is sprayed into the flue gas. A small amount of activated carbon is added to a feed suspension of alkaline solid components such as calcium hydroxide. This suspension is sprayed into the flue gas with the primary intention of removing acid gases such as sulfur dioxide. Evaporation of the aqueous suspension produces airborne particles. The activated carbon used in the disclosed method is in much lower concentrations than the alkali components and the resultant particles are characterized by Moller et al. as activated carbon "embedded in the particulate matter comprising the reaction products of e.g. calcium hydroxide and the acidic components of the gas." This co-injection of lime (calcium hydroxide) and carbon, for the separate removal of acid gases and vapor phase toxins leads to nearly complete coating of the activated carbon with acid gas-alkali reaction products. The resultant carbon particles are substantially reduced in usable adsorptive surface area as the coating of lime or other alkaline components blocks access to internal micropores.

In recent full-scale testing, it has also been demonstrated that the co-injection of an alkali with activated carbon further reduces the effectiveness of the activated carbon for mercury as the alkali removes key acid gas components, such as hydrochloric acid, that enhance effective mercury removal on activated carbon. Additionally, the methods disclosed in the two Moller et al. references both induce and depend on a substantial temperature drop (50 to 100° F.) in the flue gas to provide effective acid gas removal. Reduced flue gas temperatures tend to drive gas-particle phase partitioning toward the condensed or adsorbed phase which improves vapor-phase contaminant removal. This approach requires large amounts of water and large spray dryer towers that may increase capital and operating costs substantially and also lead to increased corrosion in the equipment and resulting increases in maintenance costs. Furthermore, other flue gas treatment steps downstream of the sorbent treatment system, such as for instance catalytic nitrogen oxide destruction, may require higher operating temperatures that necessitate reheating of the flue gas, thereby further increasing operating costs. Moller et al. do not teach wet grinding of the activated carbon to achieve small sorbent sizes nor the addition of chemicals to enhance the activated carbon effectiveness.

OBJECTS AND ADVANTAGES OF THE INVENTION

It is an object of the present invention to provide a method that overcomes many of the aforementioned problems with prior art sorbent injection systems and methods. Advantages of the present invention include a simpler, more efficient method and system for removing vapor phase contaminants such as mercury, organic compounds, and toxic metals from a gas stream such as flue gas from a fossil fuel fired power plant.

SUMMARY OF THE INVENTION

The objectives and advantages of the present invention are achieved by a method for converting difficult to collect vapor-phase contaminants in an exhaust gas stream to the airborne particle-phase so they can be more readily removed by conventional particulate air pollution control technologies.

In one embodiment of the present invention, a method is provided for removing one or more vapor-phase, adsorbable contaminants from a gas stream. A sorbent material is wet ground to form a slurry of fine sorbent particles in a solution of one or more solvents. This slurry is atomized into the gas stream to form a plurality of slurry droplets. The solvents rapidly evaporate from the slurry droplets upon encountering the gas stream to produce a dispersed aerosol of fine sorbent particles. These dispersed aerosol particles scavenge vapor-phase, adsorbable contaminants from the gas stream before being separated from the gas stream using a particle separation method.

In another embodiment of the present invention, a method is provided for removal of one or more vapor-phase contaminants from a gas stream. A sorbent powder is mixed with one or more solvents to form a slurry in a solution. The slurry also contains one or more dissolved chemical additives that enhance the ability of the fine sorbent powder particles to adsorb or react with the target vapor-phase contaminants. The slurry is atomized into the gas stream to form a plurality of slurry droplets. The plurality of slurry droplets rapidly evaporates in the heated gas stream to produce a dispersed aerosol of fine sorbent particles that are impregnated with the chemical additives that had been dissolved in the slurry solution. The dispersed aerosol particles adsorb the vapor-phase contaminants from the gas stream. Then, the aerosol sorbent particles are separated from the gas stream using a particle separation method.

In a further embodiment, a system is provided for removal of one or more vapor-phase, adsorbable contaminants from a gas stream. The system includes a mixing chamber wherein one or more solvents and one or more sorbent powders are combined to form a slurry. The slurry also contains one or more dissolved chemical additives. The slurry is delivered to the gas stream as a spray of fine droplets via an atomizer. The fine droplets quickly evaporate in the gas stream to form a dispersed aerosol of fine sorbent particles impregnated with the chemical additives. These additive-impregnated sorbent particles adsorb and remove vapor phase contaminants from the gas stream before being removed from the gas stream by a particle separator.

In an alternative embodiment of the present invention, a system is provided for removing one or more vapor-phase, adsorbable contaminants from a gas stream. The system includes a mixing chamber wherein one or more solvents and one or more sorbent powders are combined to form a slurry that contains one or more dissolved chemical additives. A grinder positioned within the mixing chamber grinds the sorbent powder into fine particles of less than approximately 5 $\mu$m diameter while mixing the solvents and additives with the fine particles to form the slurry. One or more sorbent hoppers are provided for storing the sorbent powders, and one or more sorbent metering devices is provided for supplying the sorbent powders to the mixing chamber at a controllable rate. One or more solvent source containers is provided for storing said one or more solvents, and one or more solvent metering devices is provided for supplying the solvents to the mixing chamber at a controllable rate. One or more chemical additive reservoirs is provided for storing said one or more chemical additives, and one or more additive metering devices is provided for supplying the chemical additives to the mixing chamber at a controllable rate. The slurry is delivered as a spray of fine droplets via an atomizer into the gas stream. The spray of fine droplets quickly evaporates in the gas stream to form a dispersed aerosol of fine sorbent particles impregnated with the chemical additives. These additive-impregnated aerosol particles adsorb vapor-phase contaminants from the gas phase and are then removed from the gas stream by a particle separator.

BRIEF DESCRIPTION OF THE DRAWINGS

The present invention will be better understood by reading the following detailed description in conjunction with the accompanying drawings in which:

FIG. 3 is a flow chart outlining the steps of the method according to one embodiment of the present invention.

DETAILED DESCRIPTION OF THE INVENTION

Figure 1:
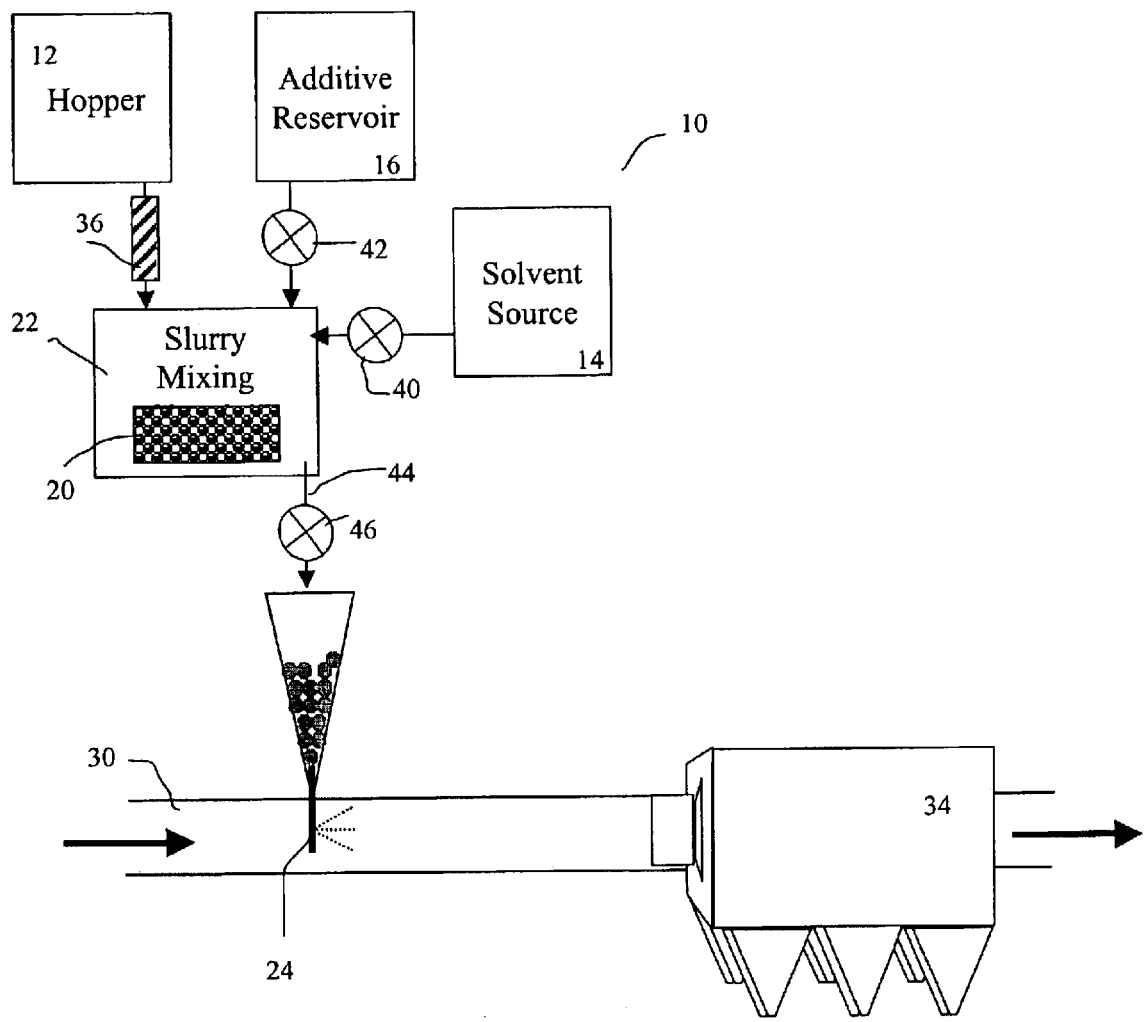
FIG. 1 is a schematic diagram of a system for adding a sorbent slurry to a gas stream according to one embodiment of the present invention.

Modeling calculations of mercury removal in coal-derived flue gas by sorbent injection and field test data show that smaller sorbent particle sizes are more effective at mercury removal with low sorbent injection rates or at low duct residence times. For some sorbents such as activated carbon, impregnation with chemical additives enhances the sorbent effectiveness for specific vapor phase contaminants such as mercury. The present invention provides a method to achieve these objectives without requiring complicated processing steps and excessive energy usage or leading to handling difficulties associated with dry powders of very fine particle size.

More particularly, one embodiment of the present invention employs wet grinding techniques to prepare a slurry of very small sorbent particles. Chemical additives in solution are added during wet grinding to impregnate and enhance the sorbent effectiveness for specific vapor phase contaminants. Wet grinding provides significant advantages in handling, storing, and dispensing a fine powder into an airstream in a controlled manner. Additionally, smaller sorbent particle sizes can be achieved for a given grinding energy expenditure for wet grinding than for dry grinding. Dust production is minimized as is caking and clumping which hinder accurate metered delivery of the sorbent particles to the exhaust gas. Alternatively, the slurry may be formed by the addition of a sorbent powder of small particle size to a solution containing one or more chemical additives. Once the slurry is prepared, it is injected into a gas stream. The sorbent powder is preferably activated carbon. However, other comparable sorbents, such as granular activated carbon, powdered activated carbon, carbon black, powdered coal, kaolinites or other clays, zeolites, and alumina may also be employed.

Evaporation of the slurry liquid occurs very rapidly after the slurry is atomized into the exhaust gas for a properly selected droplet size. As the slurry liquid evaporates, the chemical additives in solution within the sorbent pore structures dry and impregnate the sorbent pore surfaces uniformly to provide a chemically active surface for adsorption. A minimal amount of liquid can be used for suspension and/or wet grinding of the sorbent particles to minimize the resultant temperature drop in the flue gas stream when the slurry is injected. Use of additives that are dissolved rather than merely suspended in the slurry solvent allows penetration of the dissolved compounds into the pores of the sorbent particles. Then, when the solvent evaporates in the gas stream after atomization, the solvent volatilizes, leaving the additive molecules impregnated within the sorbent particle pore structure rather than merely adhering to the outer surfaces of each individual particle. In this manner, the majority of the surface area of the sorbent particles is uniformly impregnated and made available for reaction with and subsequent removal of gas-phase contaminants in the gas stream.

In one embodiment of the present invention, a system is provided for removing vapor phase contaminants from a gas stream. As illustrated in FIG. 1, the system 10 generally comprises a storage hopper 12 for granular or coarse sorbent raw material, a solvent feed source 14,one or more reservoirs 16 for additives, a grinder 20 in a slurry mixing chamber 22,and an atomizer 24 positioned to deliver the slurry within a gas stream. Powdered sorbent is preferably transported at a metered rate from the hopper 12 via one or more dry sorbent transport mechanisms 36 such as for instance a conveyor belt or a screw tube or the like. The dry sorbent is transported to the mixing chamber 22 which preferably contains a grinder 20. Simultaneously, the water, although other solvents or mixtures of other solvents and water are also possible, is metered via one or more metering valves or metering pumps or other similar solvent metering mechanisms 40 from the solvent feed source 14 to the mixing chamber 22. Also provided to the mixing chamber 22 via one or more chemical additive metering mechanisms 42,such as a metering valve, conveyor system, or other comparable dry material transport device is one or more chemical additives such as sulfur and halide compounds including, but not limited to sulfite and bisulfite salts; hydrogen sulfide; sulfide, tetrasulfide, and other and polysulfide salts; iodide and iodate salts, chloride and chlorate salts, bromide and bromate salts. In the slurry mixing chamber 22, the grinder 20 wet grinds the sorbent powder to very small particle sizes in the range of less than approximately 5 $\mu$m and preferably less than approximately 3 $\mu$m. As a consequence of the wet grinding process, the water, the ground sorbent, and the one or more additives provided from the one or more additive reservoirs 16 are combined into a well mixed slurry. Alternatively, the sorbent powder may be combined with the additive solutions or solutions without additional wet grinding. The resultant slurry of small sorbent particles suspended in a solution of one or more chemical additives is transported at a controlled rate via a slurry delivery tube 44 controlled by a slurry metering device 46,that may be a metering valve, a metering pump, or some other mechanism for controlling the flow of a suspension, to the atomizer 24. The atomizer delivers the slurry in the form of small, atomized droplets to the gas stream in for example, a duct 30. The gas stream to be treated is continuously flowed past the atomizer 24 via the duct 30. Within the duct 30 downstream from the atomizer 24,the heated gas evaporates the solvent from the atomized droplets to generate a dispersed aerosol of fine sorbent particles impregnated with the one or more additives added to the slurry in the slurry mixing chamber 22. The amount of slurry and its accompanying moisture that is added via the atomizer is preferably small enough to minimize the temperature drop within the gas stream. It is preferred that the temperature drop caused by the sorbent slurry injection be less than approximately 10° C., and more preferably of less than approximately 5° C. Injection of a larger volume of slurry and accompanying water to cause a greater temperature drop is not inconsistent with the method of the present invention. However, by providing substantially improved sorption capacity on the injected sorbent particles, the system and method of the present invention facilitates operation of a flue gas cleaning system with a much smaller sorbent injection requirement. Prior art methods rely to some extent on lowering of the flue gas temperature to increase the sorption capacity of injected activated carbon. Addition of the additives described above and/or wet grinding of the slurry to produce very fine sorbent particles impregnated with the additives increases the sorption capacity of the injected sorbent sufficiently to allow operation of a gas cleaning system with much lower sorbent requirements which results in a substantial cost reduction relative to prior art systems and methods. Some flue gas cleaning systems include downstream catalytic reactors for the removal of, for example, nitrogen oxides. These catalysts often require elevated temperatures for most effective removal of the target compounds. Minimization of the temperature drop due to sorbent slurry injection as taught in the present invention may eliminate the need for reheating of the gas stream, as well as the associated elevated operating and capital costs, prior to catalytic treatment.

In the gas flow downstream of the atomizer 24, the dispersed aerosol as well as not yet evaporated slurry droplets interact with contaminants such as mercury, metals, organics and other semivolatile or volatile contaminants which may partition into the particle phase in the gas stream to adsorb the contaminants. The gas and aerosol mixture flows to the particle separator 34, preferably in the duct 30, although any commonly employed means of channeling gas is acceptable. The particle separator 34 is preferably a baghouse filter or an electrostatic precipitator. However, any particle separation device that is capable of efficiently removing particles of the sizes specified herein from a flowing gas mixture is acceptable.

Figure 2:
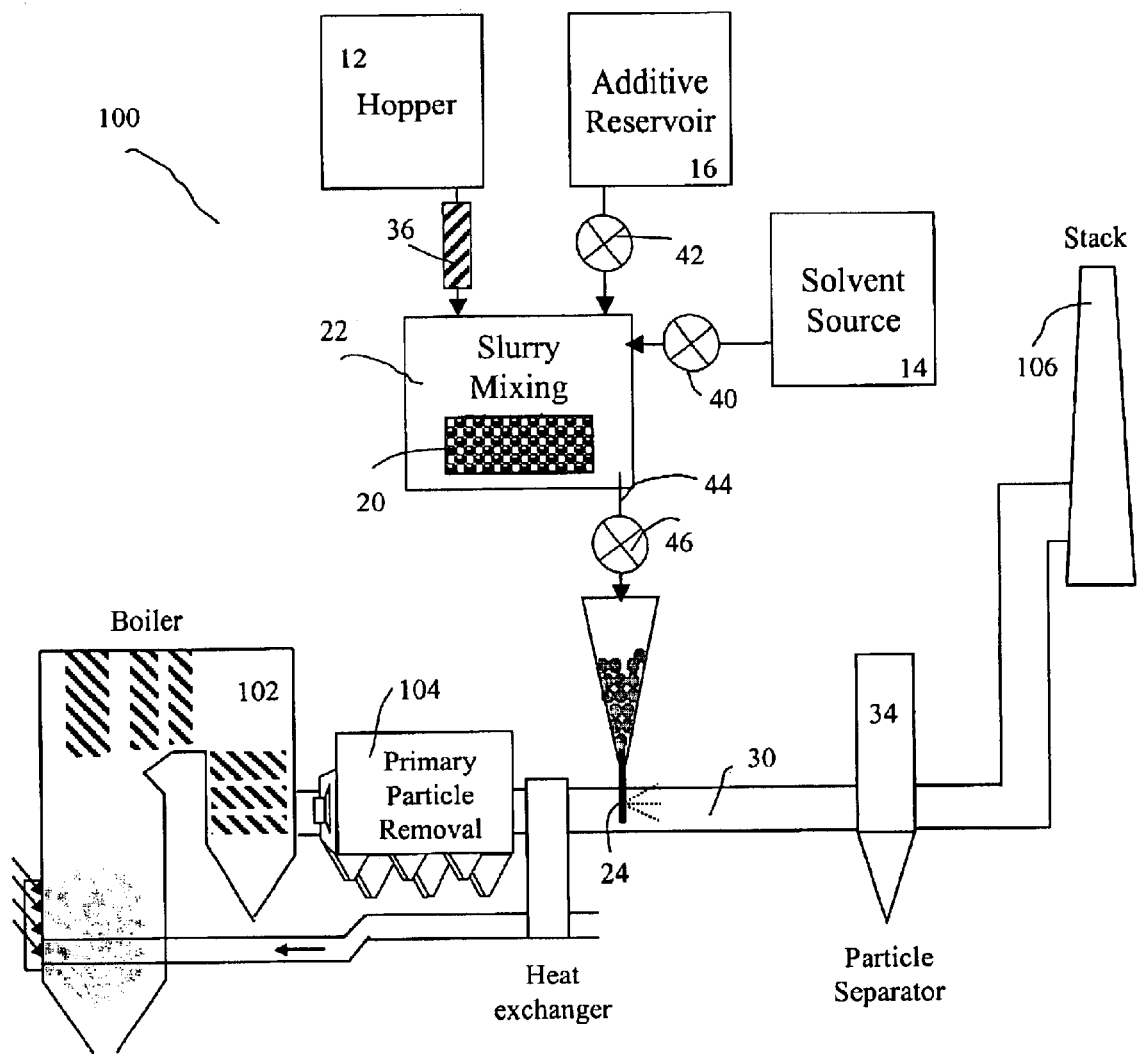
FIG. 2 is a schematic diagram of a system for incorporating one embodiment of the present invention into a system for removing contaminants from the flue gas of a fossil fuel fired electric power plant.

In a further embodiment of the present invention, the aforementioned system for removing vapor phase contaminants is incorporated into the flue gas system of a coal fired power plant. In this embodiment, an example of which is shown schematically in FIG. 2, the system 100 includes a boiler chamber 102 in which coal is combusted to generate steam to run a turbine (not shown). Flue gases from the boiler chamber are transported via the duct 30 past the atomizer 24. In a preferred but not necessary embodiment, the flue gases exiting the boiler chamber 102 are first passed through a primary particulate collector 104 before passing the atomizer. After gases pass through the particle separation device 34, they are vented to the atmosphere through a stack 106. In another embodiment of the invention, the atomizer 24 is positioned within a spray-drying chamber (not shown). The duct 30 carries gas to the chamber wherein slurry droplets are dispersed from the atomizer. Solvent evaporates from the droplets in the chamber as well as in the gas as it flows downstream of the chamber toward the particle separation device 34.

In a further embodiment of the present invention, a method is provided for removing vapor phase contaminants from a gas stream. The flow chart 200 provided in FIG. 3 illustrates the main steps in the method. A slurry of fine sorbent particles is formed by wet grinding a powdered or granular sorbent in a solution 202. The sorbent may be preferably chosen from one or more of granular activated carbon, powdered activated carbon, carbon black, powdered coal, kaolinites or other clays, zeolites, and alumina. Alternatively, if the chosen sorbent is available in sufficiently small particle sizes, the wet grinding step may be replaced by a mixing step in which the sorbent is added to the solution and mixed to form a slurry. The solvent may preferably be water, although other solvents or combinations of solvents may be used in the alternative. The solution preferably contains one or more dissolved additives that increase the sorption capacity of the sorbent for the targeted contaminants. These additives may be chemicals such as sulfur and halide compounds including, but not limited to potassium or sodium sulfite or bisulfite, other sulfites and bisulfites, sulfide salts, tetrasulfide salts, other polysulfide salts, iodides, iodates, chlorides, chlorates, bromides, and bromates. The slurry is atomized into the gas stream 204 wherein the solvent substantially volatilizes 206 to produce a substantially dispersed aerosol of sorbent particles impregnated with the aforementioned additives. A small volume of solvent is preferably used such that the temperature drop caused by its volatilization is minimized. The induced temperature drop is preferably less than approximately 10° C. and more preferably less than approximately 5° C. As the dispersed aerosol of additive-impregnated sorbent particles travels with the gas stream, vapor-phase contaminants are scavenged from the gas stream onto the sorbent particles 210. Finally, the contaminant-enriched aerosol particles are separated from the gas stream 212 using a particle separation method such as, for instance, an electrostatic precipitator or a baghouse filter.

Wet grinding overcomes many of the problems associated with prior art sorbent injection systems for vapor phase contaminant removal. Grinding of dry powders to form very small particles is very energy intensive. Smaller particle sizes are attainable with substantially smaller energy inputs in a wet grinding system. Additionally, very fine dry powders are susceptible to caking which can hinder accurate control of the dosing rate of these materials into a gas stream. In the event that sufficiently small sorbent particles are available commercially or through production from larger sorbent particles by some other method, the sorbent particles may be added-to the additive solution and mixed to form a slurry as described above. While smaller sorbent particle sizes, such as smaller than approximately 5 $\mu$m or more preferably smaller than approximately 3 $\mu$m in diameter are preferred, larger particles may also be used. Additive-impregnated sorbent particles formed by injecting a slurry of sorbent particles in a solution containing dissolved additives as described above has been found to substantially increase the sorption capacity of the sorbent particles even for particles larger than the preferred ranges described herein.

Experimental

A number of experiments were conducted according to the method and system of the present invention. These experiments are intended for illustration purposes only, and are not intended to limit the scope of the present invention in any way.

Additive materials were impregnated to sorbent surfaces to enhance mercury removal from simulated flue gas. Impregnation was carried out in a sorbent-containing aqueous slurry using different methods depending upon the nature of the additive. The additives were thus reacted with the sorbent material in the slurry prior to injection into flue gas. In the slurry, additive molecules become associated with the sorbent material through physical or chemical adsorption. In some cases, chemical or electrical modifications may be made to the slurry to initiate the sorbent-additive reactions. Additional additive uptake by the sorbent particles occurs during the flue gas injection process as the wet film around the sorbent particles, which contains additive material, evaporates. The dried sorbent containing the additive then reacts with mercury or other volatile compounds in the flue gas to adsorb them into the particle phase in which they are more readily removed from the exhaust gas stream by a standard particle removal method.

Table 1 lists additive materials used to enhance mercury adsorption by sorbent materials. Anion additives can be added using a variety of salts derived from metals such as sodium, calcium, potassium, iron, and tin. Sulfur and selenium are added to the sorbent slurry in the form of a salt solution. Elemental sulfur and selenium are deposited at the sorbent surface after chemically adjusting the slurry composition. Metal additives are added to the slurry as a salt solution, or in the elemental form, and are subsequently deposited at the sorbent surface after making either an electrical or chemical modification to the slurry.

TABLE 1

Sorbent Additives for Enhancing Mercury Removal from Flue Gas.

| Additive (Added as Various Salts) | Metal Additives |
|---|---|
| (Iodide) $I^-$ | Gold |
| (Iodate) $IO_3^-$ | Silver |
| (Chromate) $CrO_4^{-2}$ | Copper |
| (Manganite) $Mn_2O_7^-$ | Zinc |
| (Selenide) $Se^{-2}$ | Palladium |
| (Sulfide) $S^{-2}$ | Platinum |
| (Sulfate) $SO_4^{-2}$ | |
| Elemental Additives | |
| Selenium | |
| Sulfur | |

Table 2 lists representative data showing the effects of different additives on sorbent mercury removal from simulated flue gas. The results show that a number of additives are effective at increasing the ability of sorbent materials to adsorb both elemental mercury and mercuric chloride from simulated flue gas. In some cases, mercury adsorption was not observed with the sorbent material until after addition of the additive material.

TABLE 2

Effect of Chemical Impregnation of Sorbent Materials on Mercury Adsorption Capacity from Simulated Flue Gas at 275° F.

| | | Equilibrium Adsorption Capacity ($\mu g$ Hg/g sorbent) | |
|---|---|---|---|
| SAMPLE TESTED | Enhancement Additive | Baseline Capacity (no additive present) | Capacity with Additive |
| Mercuric Chloride Adsorption | | | |
| Bituminous coal-derived activated carbon | Sulfur | 739 | 3299 |
| | Iodine | | 1004 |
| | Chloride | | 998 |
| | Silver | | 984 |
| Fly ash derived from sub-bituminous coal | Iodine | 0 | 51 |
| | Manganese | | 8 |
| | Fluoride | | 35 |
| | Sodium Sulfide | | 338 |
| Elemental Mercury Adsorption | | | |
| Bituminous coal-derived activated carbon | Iodine | 450 | 729 |
| Lignite-derived activated carbon | Sulfur | 914 | 1643 |
| | Fluoride | | 1530 |
| | Chloride | | 3856 |
| Carbon black | Chloride | 299 | 1450 |
| | Sulfur | | 1245 |

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for removal of one or more vapor-phase contaminants from a gas stream, comprising the steps of:
    wet grinding a sorbent powder to form a slurry of fine sorbent particles in a solution of one or more solvents;
    atomizing said slurry into said gas stream to form a plurality of slurry droplets, said plurality of slurry droplets rapidly evaporating to produce a dispersed aerosol of said fine sorbent particles, said sorbent particles adsorbing said vapor-phase contaminants from said gas stream; and
    separating said aerosol sorbent particles from said gas stream using a particle separation method.

2. The method of claim 1 wherein said solution further comprises one or more chemical additives that enhance the ability of said fine sorbent particles to adsorb or react with said one or more vapor-phase contaminants.

3. The method of claim 2 wherein said one or more additives are selected from the group consisting of potassium iodide, potassium iodate, soluble salts containing iodine, soluble salts containing bromine, soluble salts containing chloride, hydrogen sulfide, sulfite salts, and tetrasulfide salts.

4. The method of claim 1 wherein said one or more vapor-phase, contaminants are selected from the group consisting of mercury, selenium, arsenic, lead, nickel, chromium, dioxins, furans, and other toxic metals and organic compounds.

5. The method of claim 1 wherein said particle separation method comprises passing said gas stream through a baghouse filter.

6. The method of claim 1 wherein said particle separation method comprises passing said gas stream through an electrostatic precipitator.

7. The method of claim 1 wherein said fine sorbent particles are smaller than approximately 10 $\mu$m in diameter.

8. The method of claim 1 wherein said fine sorbent particles are smaller than approximately 5 $\mu$m in diameter.

9. The method of claim 1 wherein said fine sorbent particles are smaller than approximately 3 $\mu$m in diameter.

10. The method of claim 1 wherein said sorbent is activated carbon.

11. A method for removal of one or more vapor-phase contaminants from a gas stream, comprising the steps of:

mixing fine sorbent powder particles with a solution to form a slurry, said solution further comprising one or more additives that enhance the ability of said fine sorbent powder particles to adsorb or react with said one or more vapor-phase contaminants;

atomizing said slurry into said gas stream to form a plurality of slurry droplets, said plurality of slurry droplets rapidly evaporating to produce a dispersed aerosol of said fine sorbent powder particles, said fine sorbent powder particles being impregnated with said additives, said sorbent particles adsorbing said vapor-phase contaminants from said gas stream; and separating said aerosol of fine sorbent powder particles from said gas stream using a particle separation method.

12. The method of claim 11 wherein said one or more additives are selected from the group consisting of potassium iodide, potassium iodate, soluble salts containing iodine, soluble salts containing bromine, soluble salts containing chloride, hydrogen sulfide, sulfite salts, and tetrasulfide salts.

13. A system for removal of one or more vapor-phase, adsorbable contaminants from a gas stream comprising:

a mixing chamber wherein one or more solvents and one or more fine sorbent particles are combined to form a slurry, said slurry containing one or more dissolved chemical additives;

an atomizer through which said slurry is delivered as a spray of fine droplets into said gas stream, said spray of fine droplets quickly evaporating to form a dispersed aerosol of said fine sorbent particles impregnated with said one or more additives, said additive-impregnated fine sorbent particles adsorbing said vapor-phase, adsorbable contaminants from said gas stream; and a particle separator for removing said dispersed aerosol particles from said gas stream.

14. The system of claim 13 further comprising:

a grinder positioned within said mixing chamber for grinding said one or more fine sorbent particles into fine particles of less than approximately 5 $\mu$m diameter while mixing said one or more solvents and said one or more additives with said fine particles of less than approximately 5 $\mu$m diameter to form said slurry.

15. The system of claim 13 further comprising:

one or more sorbent hoppers for storing said one or more fine sorbent particles; and a sorbent metering device for supplying said one or more fine sorbent particles to said mixing chamber at a controllable rate.

16. The system of claim 13 further comprising:

one or more solvent source containers for storing said one or more solvents; and a solvent metering device for supplying said one or more solvents to said mixing chamber at a controllable rate.

17. The system of claim 13 further comprising:

one or more chemical additive reservoirs for storing said one or more chemical additives; and an additive metering device for supplying said one or more chemical additives to said mixing chamber at a controllable rate.

18. The system of claim 13 wherein said particle separator is selected from the group consisting of a baghouse filter and an electrostatic precipitator.

19. The system of claim 13 further comprising:

a spray drying chamber through which said gas stream passes and wherein said atomizer is positioned.

20. A system for removal of one or more vapor-phase, adsorbable contaminants from a gas stream comprising:

a mixing chamber wherein one or more solvents and one or more sorbent powders are combined to form a slurry, said slurry containing one or more dissolved chemical additives;

a grinder positioned within said mixing chamber for grinding said sorbent powder into fine particles of less than approximately 5 $\mu$m diameter while mixing said one or more solvents and said one or more additives with said fine particles to form said slurry;

one or more sorbent hoppers for storing said one or more sorbent powder;

a sorbent metering device for supplying said one or more sorbent powders to said mixing chamber at a controllable rate;

one or more solvent source containers for storing said one or more solvents;

a solvent metering device for supplying said one or more solvents to said mixing chamber at a controllable rate;

one or more chemical additive reservoirs for storing said one or more chemical additives;

an additive metering device for supplying said one or more chemical additives to said mixing chamber at a controllable rate;

an atomizer through which said slurry is delivered as a spray of fine droplets into said gas stream , said spray of fine droplets quickly evaporating to form a dispersed aerosol of said fine sorbent particles impregnated with said one or more additives, said aerosol of additive-impregnated sorbent particles adsorbing said vapor-phase, adsorbable contaminants from said gas stream; and a particle separator for removing said dispersed aerosol particles from said gas stream.

* * * * *